(12) United States Patent
Yan

(10) Patent No.: US 11,731,808 B2
(45) Date of Patent: Aug. 22, 2023

(54) ENVIRONMENT-FRIENDLY PAPER PROTECTIVE BAG MANUFACTURING APPARATUS

(71) Applicant: Beta (Shenzhen) Package Products Co., Ltd, Shenzhen (CN)

(72) Inventor: Jinwei Yan, Shenzhen (CN)

(73) Assignees: BETA (SHENZHEN) PACKAGE PRODUCTS CO., LTD, Shenzhen (CN); HUIZHOU BETA PACKTECH CO., LTD, Huizhou (CN)

( * ) Notice: Subject to any disclaimer, the term of this patent is extended or adjusted under 35 U.S.C. 154(b) by 106 days.

(21) Appl. No.: 17/223,029

(22) Filed: Apr. 6, 2021

(65) Prior Publication Data

US 2021/0221567 A1 Jul. 22, 2021

Related U.S. Application Data

(60) Continuation-in-part of application No. 16/878,645, filed on May 20, 2020, which is a division of
(Continued)

(30) Foreign Application Priority Data

Mar. 29, 2019 (CN) .......................... 201910252856.0
Mar. 29, 2019 (CN) .......................... 201920419356.7
Aug. 8, 2019 (CN) .......................... 201910731634.7

(51) Int. Cl.
*B31B 70/02* (2017.01)
*B31B 70/20* (2017.01)
(Continued)

(52) U.S. Cl.
CPC ............ *B65D 31/02* (2013.01); *B31B 70/005* (2017.08); *B31B 70/02* (2017.08); *B31B 70/024* (2017.08);
(Continued)

(58) Field of Classification Search
CPC ...... B65D 31/02; B65D 65/406; B65D 65/44; B65D 65/466; B32B 29/005;
(Continued)

(56) References Cited

U.S. PATENT DOCUMENTS 3,097,618 A * 7/1963 Davis ...................... B31B 70/00
493/193
3,260,171 A * 7/1966 Brockmuller ........... B31B 70/00
493/276

(Continued)

*Primary Examiner* — Joshua G Kotis

(57) ABSTRACT

A manufacturing apparatus of an environmental paper protective bag includes a planar structure manufacturing device including an inner layer unreeling module, an outer layer unreeling module and an inner-core layer unreeling module for unreeling multi-layer paper material, the unreeled multi-layer paper material superimposed, and arranged on a working platform to be transmitted along a conveying direction thereof; a tension adjusting device configured to adjust tension of the multi-layer paper material, a stretching module configured to stretch paper that has been die-cut into a network three-dimensional structure, a plurality of first gluing modules configured to glue bonding positions of the multi-layer paper material to join the multi-layer paper material together, a first press-fit module configured to press the bonding positions of glued multi-layer paper material to form a planar structure, which can solve a technical problem that conventional production equipments can't produce a protective bag with an inner-core layer.

9 Claims, 11 Drawing Sheets

Related U.S. Application Data application No. 16/795,554, filed on Feb. 19, 2020, now Pat. No. 10,850,891, and a continuation-in-part of application No. PCT/CN2019/121161, filed on Nov. 27, 2019, and a continuation-in-part of application No. PCT/CN2019/110740, filed on Oct. 12, 2019, and a continuation-in-part of application No. PCT/CN2019/090469, filed on Jun. 10, 2019.

(51) Int. Cl.
| | |
|---|---|
| *B31B 70/62* | (2017.01) |
| *B65D 30/08* | (2006.01) |
| *B31B 70/26* | (2017.01) |
| *B31B 70/00* | (2017.01) |
| *B32B 1/00* | (2006.01) |
| *B32B 3/26* | (2006.01) |
| *B32B 29/00* | (2006.01) |
| *B65D 65/40* | (2006.01) |
| *B65D 81/02* | (2006.01) |
| *B65D 65/46* | (2006.01) |
| *B65D 81/03* | (2006.01) |
| *B31D 5/00* | (2017.01) |
| *B31B 170/20* | (2017.01) |

(52) U.S. Cl.
CPC .............. *B31B 70/20* (2017.08); *B31B 70/26* (2017.08); *B31B 70/62* (2017.08); *B32B 1/00* (2013.01); *B32B 3/266* (2013.01); *B32B 29/005* (2013.01); *B65D 65/406* (2013.01); *B65D 65/44* (2013.01); *B65D 65/466* (2013.01); *B65D 81/03* (2013.01); *B31B 2170/20* (2017.08); *B31D 5/0065* (2013.01); *B32B 2250/26* (2013.01); *B32B 2439/06* (2013.01); *B32B 2553/00* (2013.01)

(58) Field of Classification Search
CPC ..... B32B 2439/06; B31B 70/02; B31B 70/04; B31B 70/024; B31B 70/142; B31B 70/26; B31B 70/16; B31B 70/18; B31B 70/62; B31B 2170/20; B31D 1/0031
See application file for complete search history.

(56) References Cited

U.S. PATENT DOCUMENTS

| | | | | |
|---|---|---|---|---|
| 3,412,925 | A * | 11/1968 | Booth | B31B 70/85 |
| | | | | 383/114 |
| 5,117,610 | A * | 6/1992 | Hartman | B41F 17/02 |
| | | | | 53/553 |
| 5,688,578 | A * | 11/1997 | Goodrich | B31D 5/0069 |
| | | | | 428/184 |
| 10,773,839 | B1 * | 9/2020 | Talda | B65B 61/28 |
| 2019/0062028 | A1 * | 2/2019 | Getty | B32B 27/10 |
| 2019/0100369 | A1 * | 4/2019 | Hoffman | B65D 65/406 |

* cited by examiner

ENVIRONMENT-FRIENDLY PAPER PROTECTIVE BAG MANUFACTURING APPARATUS

CROSS-REFERENCE TO RELATED APPLICATIONS

The present application is a continuation-in-part of U.S. patent application Ser. No. 16/878,645, filed on May 20, 2020, which is a divisional application of U.S. application Ser. No. 16/795,554, filed on Feb. 19, 2020. The present application is a continuation-in-part of International Application No. PCT/CN2019/090469, filed on Jun. 10, 2019, International Application No. PCT/CN2019/110740, filed on Oct. 12, 2019, and International Application No. PCT/CN2019/121161, filed on Nov. 27, 2019. The present application claims priority to China Application No. 201910731634.7, filed on Aug. 8, 2019, China Application No. 201920419356.7, filed on Mar. 29, 2019, and China Application No. 201910252856.0, filed on Mar. 29, 2019. The entire contents of all of the above-mentioned patent applications are hereby incorporated herein by reference.

TECHNICAL FIELD

The present disclosure generally relates to protective bags field applied to express deliveries, postal services and logistics fields, and specifically relates to a manufacturing apparatus of an environmental paper protective bag.

DESCRIPTION OF RELATED ART

Paper packages are widely used in logistics, express deliveries and postal services fields, and have advantages of low cost and are conveniently recycled. At present, some paper packaging bags on the market include buffer protective layers for protecting objects received therein. A common buffer protective layer includes paper scrap fillers, plastic bubble films, and inflatable bubbles and so on. However, these fillers will cause environmental pollution more or less, for example, the paper scrap fillers can cause air dust pollution during production, and after using the plastic bubble films or the inflatable bubbles, plastic in the plastic bubble films or the inflatable bubbles is difficult to be separated, be recycled, and be degraded.

Therefore, a new protective bag with an inner-core layer of the present disclosure is designed, which is made of paper material and a special equipment is needed during producing the protective bag.

SUMMARY

The technical problems to be solved: in view of the shortcomings of the related art, the present disclosure provides to a manufacturing apparatus of an environmental paper protective bag, which can solve a technical problem that conventional production equipment can't produce the protective bag with an inner-core layer therein.

In a first aspect, a manufacturing apparatus of an environmental paper protective bag according to an embodiment of the present disclosure is used to produce the environmental paper protective bag made by a planar structure, the planar structure including an inner layer, an outer layer and an inner-core layer clamped between the inner layer and the outer layer to form a buffer, the inner-core layer including at least one layer of liner, the at least one layer of liner is a network three-dimensional structure formed by stretching a middle-layer paper material that has been die-cut, the manufacturing apparatus including:

first and second planar structure manufacturing devices arranged opposite to each other, each planar structure manufacturing device configured to produce the planar structure, each of the first and second planar structure manufacturing devices including:

a frame including a working platform arranged along a conveying direction of paper material;

an inner layer unreeling module and an outer layer unreeling module respectively arranged on the frame and respectively configured to unreel inner-layer paper material and outer-layer paper material, and at least one inner-core layer unreeling module arranged between the inner layer unreeling module and the outer layer unreeling module, and configured to unreel the middle-layer paper material, the inner layer unreeling module, the at least one inner-core layer unreeling module and the outer layer unreeling module arranged in turn along the conveying direction, wherein all the inner-layer paper material, the middle-layer paper material and the outer-layer paper material that have been unreeled are superimposed in turn, and arranged on the working platform to be transmitted along the conveying direction thereof;

a first tension adjusting device arranged between the inner layer unreeling module and the working platform and configured to adjust tension of the inner-layer paper material; a second tension adjusting device arranged between the inner-core layer unreeling module and the working platform and configured to adjust tension of the middle-layer paper material; a third tension adjusting device arranged between the outer layer unreeling module and the working platform and configured to adjust tension of the outer-layer paper material;

a stretching module arranged at a rear end of the second tension adjusting device and configured to stretch the middle-layer paper material that has been die-cut into the network three-dimensional structure so as to form the at least one layer of liner and then transmit the at least one layer of liner to the working platform;

a plurality of first gluing modules arranged on the frame and facing towards the working platform, each of the inner-layer paper material, the at least one layer of liner and the outer-layer paper material associated with at least one of the plurality of first gluing modules, the plurality of first gluing modules configured to glue bonding positions of each layer of the inner-layer paper material, the at least one layer of liner and the outer-layer paper material to join the inner-layer paper material, the at least one layer of liner and the outer-layer paper material together;

a first press-fit module arranged at a back end of the third tension adjusting device and configured to press and fit the glued bonding positions to form the planar structure.

Wherein, first and second planar structures produced by the first and second planar structure manufacturing devices, respectively, are superimposed with each other along the conveying direction to be conveyed synchronously;

the manufacturing apparatus further including:

a second gluing module configured to glue edge surfaces of any one of the first and second planar structures so as to adhere one of the first and second planar structures to an edge of the other of the first and second planar structures;

a second press-fit module configured to press and fit the glued bonding positions of the first and second planar structures;

a cutting module configured to cut the two pressed planar structures into a plurality of bag-body units;

a gluing and edge-folding module configured to glue sides of the plurality of bag-body units and then fold and press glued sides together to form a bottom of the protective bag.

It can be seen from the manufacturing apparatus of the present disclosure, first, the inner-layer paper material, the middle-layer paper material of the inner-core layer and the outer-layer paper material are superimposed successively. Before superimposing the inner-layer paper material, the middle-layer paper material of the inner-core layer and the outer-layer paper material, each of the inner-layer paper material, the middle-layer paper material of the inner-core layer and the outer-layer paper material is individually glued, and after superimposing the inner-layer paper material, the middle-layer paper material of the inner-core layer and the outer-layer paper material, the inner-layer paper material, the middle-layer paper material paper of the inner-core layer and the outer-layer paper material are pressed together by passing through the first press-fit module set at the back end of the working platform, so as to form the planar structure with an inner-core layer thereof to constitute the protective bag. Furthermore, after one of the first and second planar structures is superimposed with the other of the first and second planar structures, a surface of one of the first and second planar structures is first glued and then pressed and fit bonding positions, and finally cut and folded the bonding positions, to form the protective bag. During producing the inner-core layer via the manufacturing apparatus of the present disclosure, after the middle-layer paper material is die-cut, the middle-layer paper material under an un-stretched state is transmitted from the inner-core layer unreeling module to the stretching module, and then is stretched by the stretching module to form the liner with the network three-dimensional structure, and then, the liner applied as the inner-core layer paper material is clamped between the inner-layer paper material and the outer-layer paper material and then are conveyed to the working platform to form the planar structure, wherein a better protective effect can be obtained by the inner-core layer with the network three-dimensional structure.

Moreover, according to requirements of the planar structure, the manufacturing apparatus of the present disclosure can be customized to set number of liners in the inner-core layer, and a plurality of arbitrary number of inner-core layer unreeling modules can be set, which is of strong adaptability.

Furthermore, the planar structure is glued by the first gluing module, glued positions are respectively pressed and fit by the first press-fit module, and then the same glued positions of the planar structure is further glued by the second gluing module and pressed and fit again by the second press-fit module. In this way, the same glued positions can be glued, and pressed and fit by multiple times so that the protective bag is formed with a strong strength, a high quality and difficult to be damaged.

DETAILED DESCRIPTION

Figure 1:
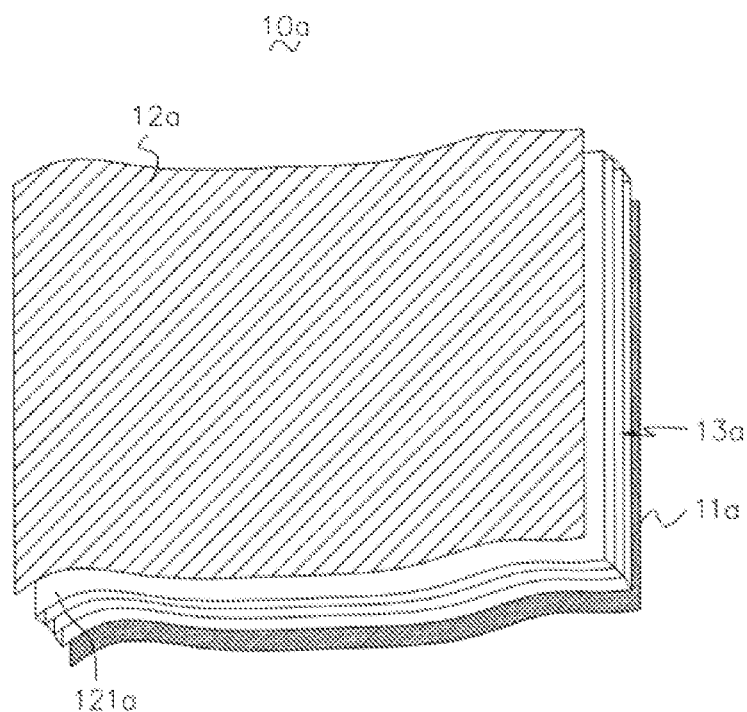
FIG. 1 is a schematic view of a planar structure in accordance with an embodiment of the present disclosure.

The disclosure is illustrated by way of example and not by way of limitation in the figures of the accompanying drawings, in which like reference numerals indicate similar elements.

Figure 2:
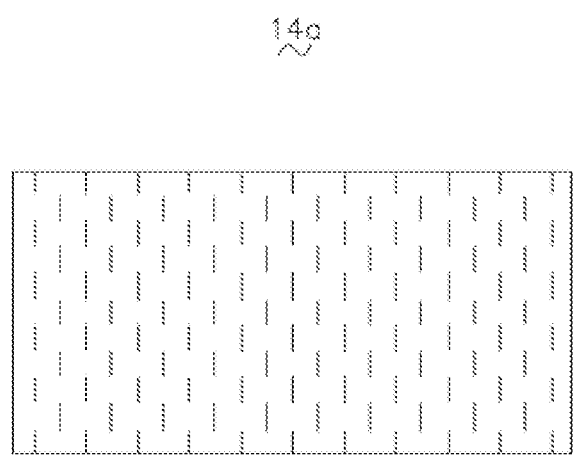
FIG. 2 is a schematic view of paper that has been die-cut of the present disclosure.
Figure 3:
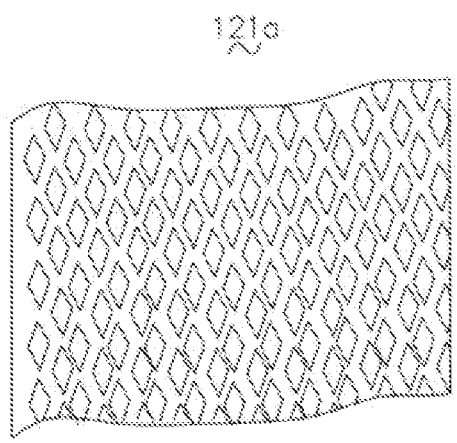
FIG. 3 is a schematic view of a liner formed by the paper that has been die-cut after the paper that has been die-cut of the present disclosure is stretched.

Referring to FIGS. 1-3, a manufacturing apparatus 100 of an environmental paper protective bag according to an embodiment of the present disclosure is used to produce the environmental paper protective bag made by a planar structure 10*a*. The planar structure 10*a* includes an inner layer 11*a*, an outer layer 13*a* and an inner-core layer 12*a* clamped between the inner layer 11*a* and the outer layer 13*a* to form a buffer, the inner-core layer 12*a* including at least one layer of liner 121*a*, after die-cutting paper 14*a* is die-cut, the at least one layer of liner 121*a* is formed by stretching the die-cutting paper 14*a*, to form a network three-dimensional structure. In the present disclosure, the die-cutting paper 141*a* means that a middle-layer paper material has been die-cut.

Figure 4:
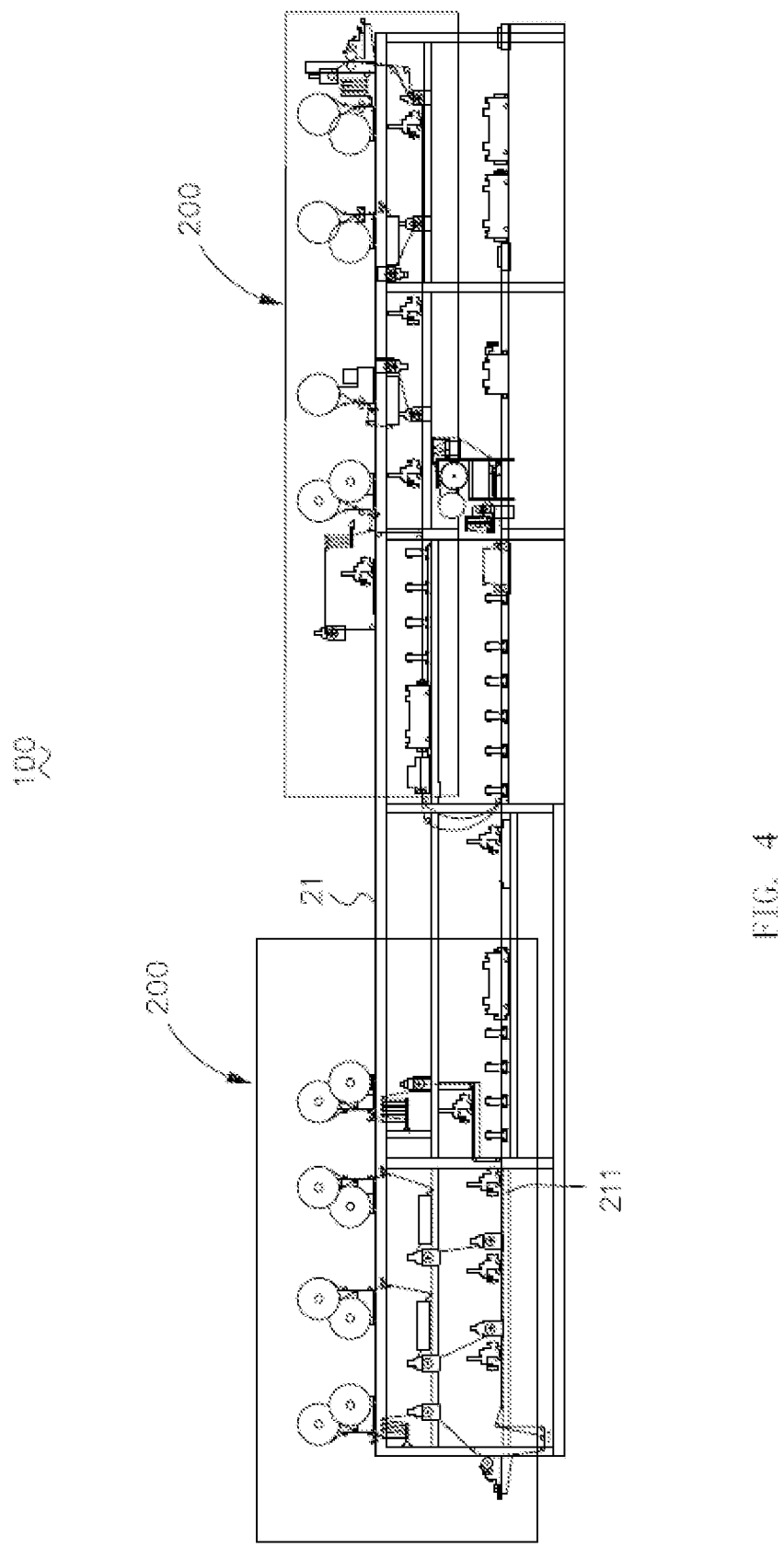
FIG. 4 is a schematic view of a manufacturing apparatus of a protective bag in accordance with an embodiment of the present disclosure.

Referring to FIG. 4, the manufacturing apparatus 100 includes first and second planar structure manufacturing devices 200 opposite to each other, each of the first and second planar structure manufacturing devices 200 configured to produce first and second planar structures 10*a*, respectively.

Figure 5:
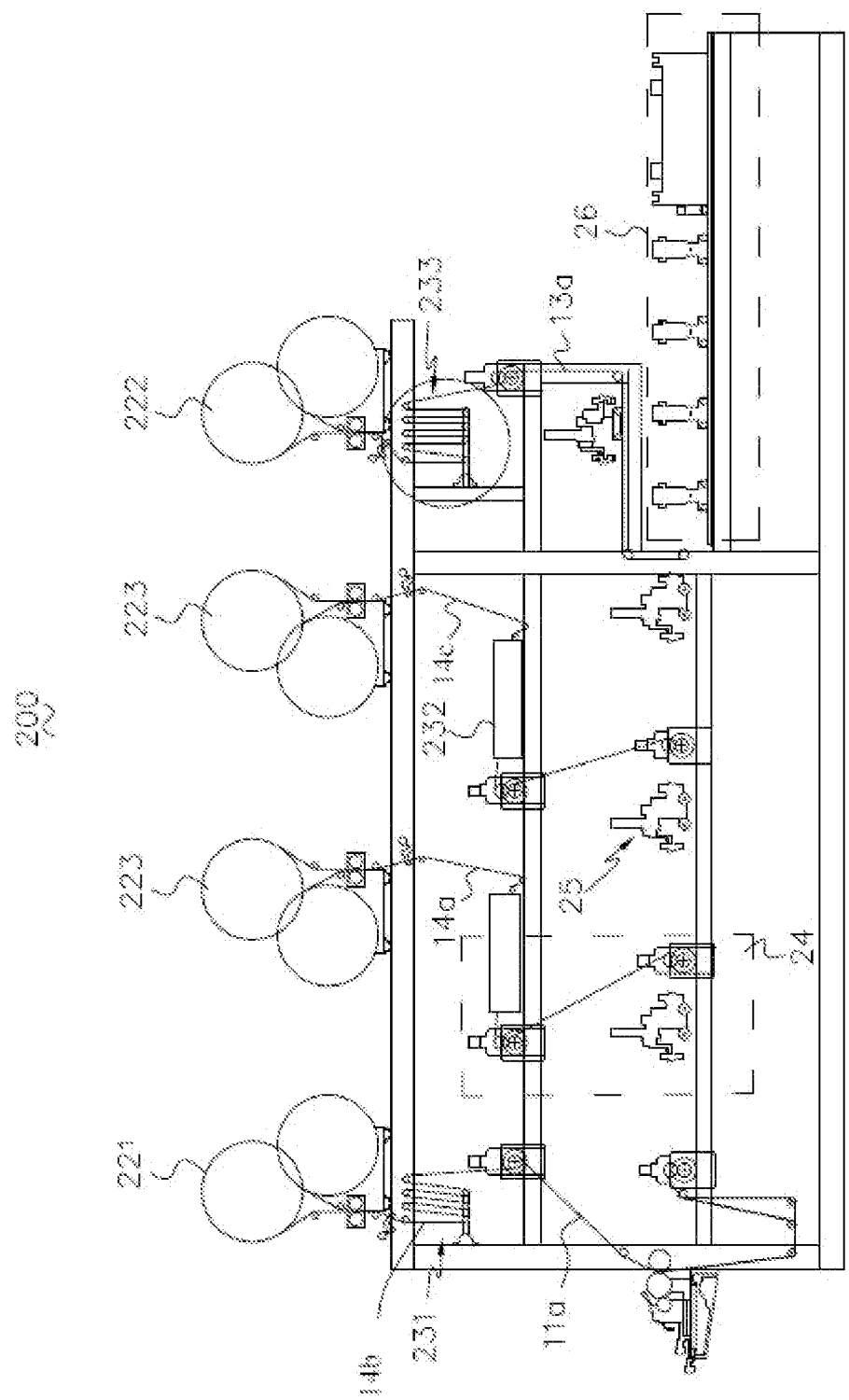
FIG. 5 and FIG. 6 are respectively schematic views of planar structure manufacturing devices in accordance with an embodiment of the present disclosure.
Figure 6:
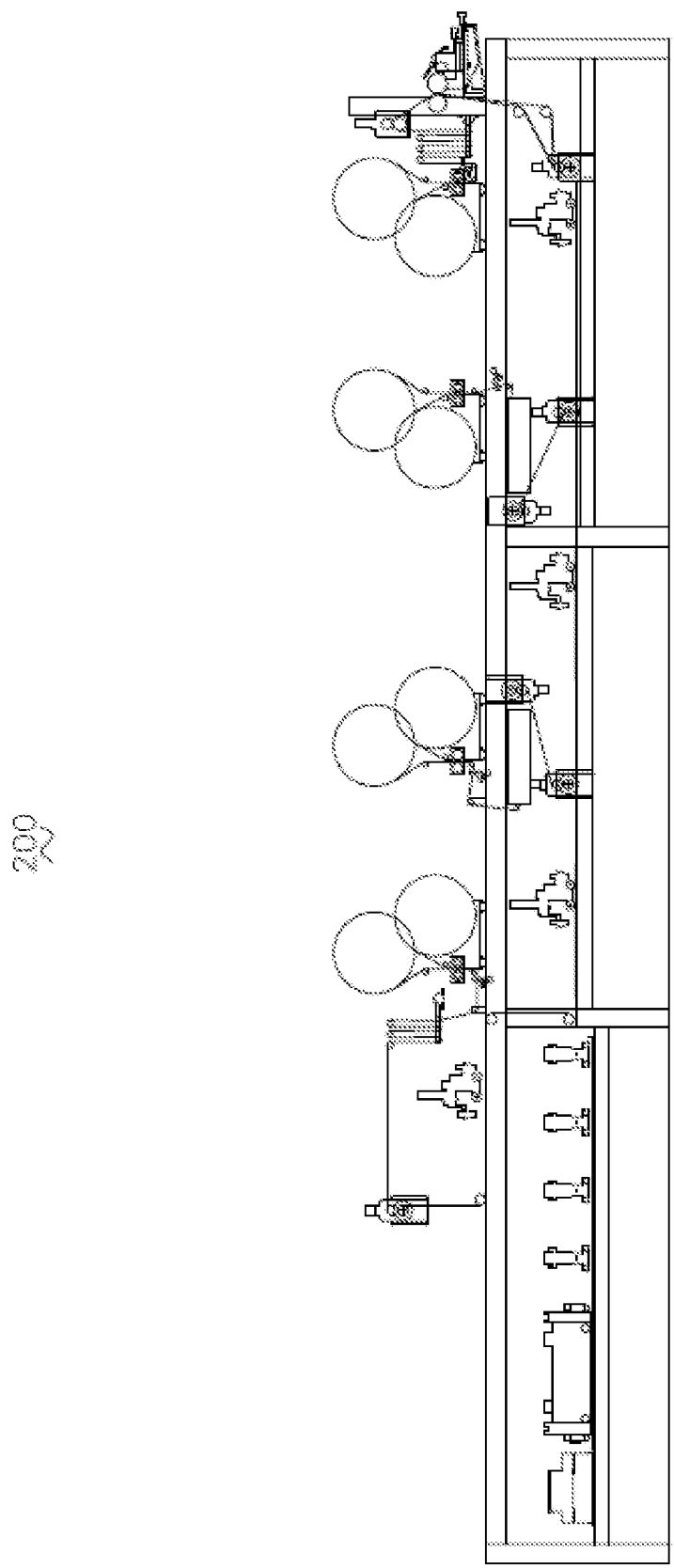

Referring to FIG. 5 and FIG. 6, specifically, each of the first and second planar structure manufacturing devices 200 includes a frame 21 including a working platform 211 arranged along a conveying direction of paper material. In a preferred embodiment of the present disclosure, the frame 21 is designed as a configuration with an upper layer and a lower layer, in which the upper layer can set peripheral devices, and the lower layer is played as the work platform 211, thereby the manufacturing apparatus 100 can be a compact configuration, occupy a small area and save resources.

Furthermore, each of the first and second planar structure manufacturing devices 200 further includes: an inner layer unreeling module 221, an inner-core layer unreeling module 223, an outer layer unreeling module 222, a first tension adjusting device 231, a second tension adjusting device 232, a third tension adjusting device 233 and a stretching module 24.

Specifically, all the inner layer unreeling module 221, the inner-core layer unreeling module 223, and the outer layer unreeling module 222 are arranged on the upper layer of the frame 21, and the inner-core layer unreeling module 223 is formed between the inner layer unreeling module 221 and the outer layer unreeling module 222 and mainly configured to unreel the die-cutting paper 14a. The inner layer unreeling module 221, the inner-core layer unreeling module 223 and the outer layer unreeling module 222 are arranged in turn along the conveying direction, and an unreeled inner-layer paper material 14b, the die-cutting paper 14a and an outer-layer paper material 14c are superimposed from the inside to the outside, that is, the unreeled inner-layer paper material 14b, the die-cutting paper 14a and the outer-layer paper material 14c are superimposed in turn and arranged on the working platform 211. The above unreeled multi-layer paper material superimposed is conveyed along the conveying direction on the working platform 211.

Furthermore, the first tension adjusting device 231 is configured to adjust tension of the inner-layer paper material 14b, the second tension adjusting device 232 is configured to adjust tension of the die-cutting paper 14a, and the third tension adjusting device 233 is configured to adjust tension of the outer-layer paper material 14c, so as to prevent the paper material from being wrinkled and folded, etc. The first tension adjusting device 231 is arranged between the inner layer unreeling module 221 and the working platform 211, the second tension adjusting device 232 is arranged between the inner-core layer unreeling module 223 and the working platform 211, and the third tension adjusting device 233 is arranged between the outer layer unreeling module 222 and the working platform 211.

Figure 7:
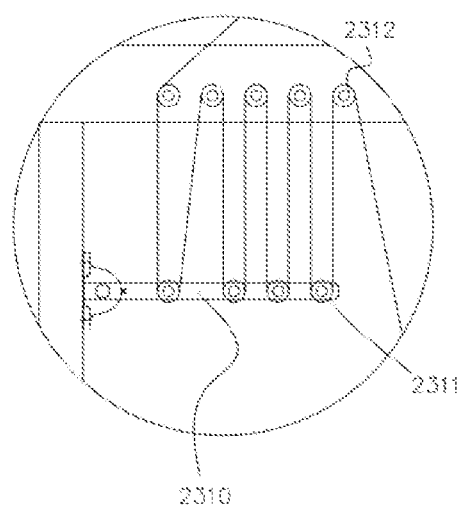
FIG. 7 is a schematic view of a first tension adjusting device in accordance with an embodiment of the present disclosure.

Referring to FIG. 7, furthermore, the structure of the first tension adjusting device 231 is same as that of the third tension adjusting device 233. The first tension adjusting device 231 includes a swing arm 2310, with an end being positioned on the frame 21, rotating relative to the frame 21, a plurality of rotating rollers 2311 arranged on the swing arm 2310, and a plurality of rotating rods 2312 positioned on the frame 21 and capable of be rotated. The unreeled inner-layer paper material 14b and the unreeled outer-layer paper material 14c are respectively inserted between the plurality of rotating rods 2312 and the plurality of rotating rollers 2311, so as to adaptively adjust the tension of the die-cutting paper 14a, the inner-layer paper material 14b and the outer-layer paper material 14c.

Figure 8:
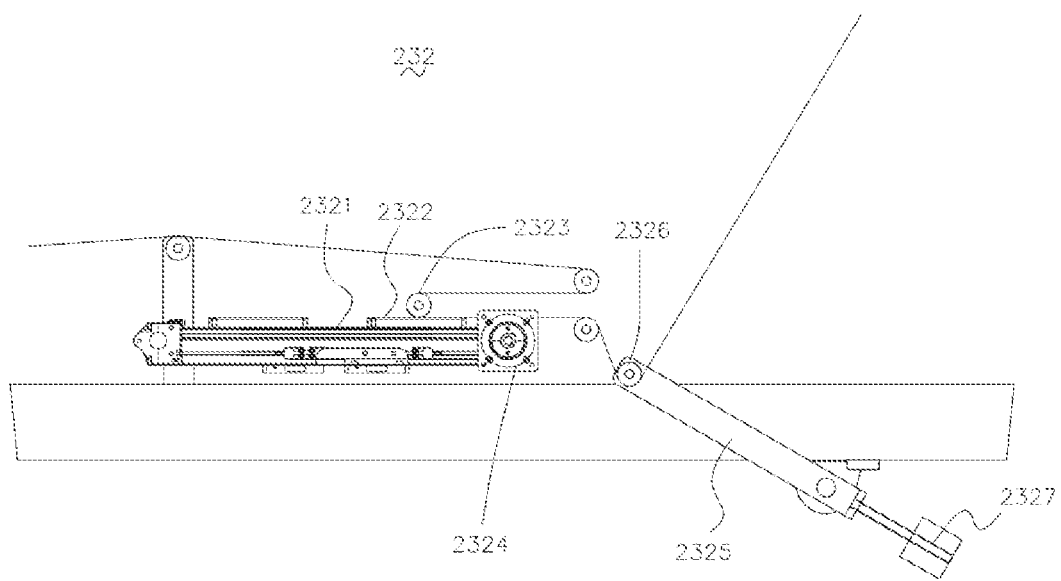
FIG. 8 is a schematic view of a second tension adjusting device in accordance with an embodiment of the present disclosure.

Referring to FIG. 8, furthermore, the second tension adjusting device 232 is configured to adjust the tension of the die-cutting paper 14a unreeled from the inner-core layer 12a, so that the die-cutting paper 14a is on an un-stretched state before passing through the stretching module 24; the second tension adjusting device 232 includes a sliding rail 2321, a sliding block 2322 installed on the sliding rail 2321, a connecting roller 2323 positioned on the sliding block 2322 and capable of being rotated, and a servo motor 2324 configured to drive the sliding block 2322 to slide on the sliding rail 2321, and the die-cutting paper 14a passing through the connecting roller 2323. In an embodiment of the present disclosure, the servo motor 2324 can be configured to automatically control the sliding rail 2321 to slide during conveying the die-cutting paper 14a, and when the sliding rail 2321 is slid in a small range, the connecting roller 2323 on the sliding rail 2321 can be driven to move, so as to adjust the tension intelligently. At this time, the tension clamped on the die-cutting paper 14a should be less than the minimum tension needed to stretch the die-cutting paper 14a.

Furthermore, the second tension adjusting device 232 further includes a swing rod 2325, a rotating wheel 2326 arranged at one end of the swing rod 2325, and an adjusting weight 2327 arranged at the other end of the swing rod 2325 and opposite to the rotating wheel 2326. When the die-cutting paper 14a enters the second tension adjusting device 232, the die-cutting paper 14a also passes through the rotating wheel 2326. The adjusting weight 2327 can rotate to adjust a torque relative to the swing rod 2325, so as to adjust the tension of the second tension adjusting device 232. By adjusting the swing rod 2325, the die-cut paper 14a can be converted under an un-stretched state.

Figure 9:
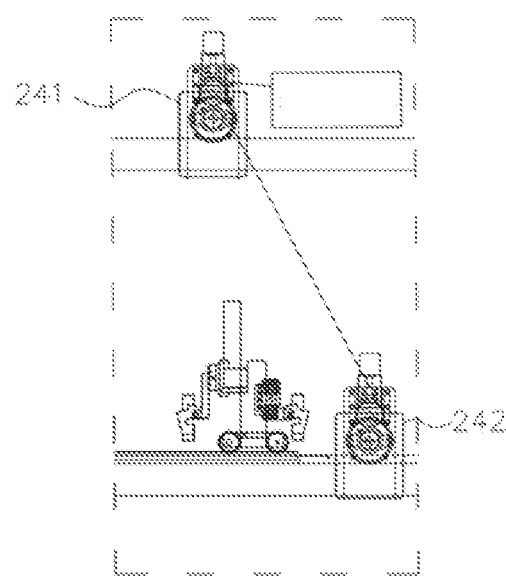
FIG. 9 is a schematic view of a stretching module in accordance with an embodiment of the present disclosure.

Referring to FIG. 9, the stretching module 24 is arranged at a rear end of the second tension adjusting device 232 and configured to stretch the die-cutting paper 14a into the network three-dimensional structure so as to form the liner 121a and then transmit the at least one layer of liner 121a to the working platform 211.

Furthermore, the stretching module 24 includes a transition roller 241 arranged on the rear end of the second tension adjusting device 232 and configured to receive the die-cutting paper 14a un-stretched; and a differential roller 242 arranged between the transition roller 241 and the working platform 211. A rotating speed of the differential roller 242 is greater than a rotating speed of the transition roller 241, so that the die-cutting paper 14a passing through the transition roller 241 is stretched into the network three-dimensional structure before entering the differential roller 242, so as to form the at least one layer of liner 121a.

In an embodiment of the present disclosure, the speed difference between the differential roller 242 and the transition roller 241 makes the tension of the die-cutting paper 14a greater than the minimum tension that the die-cutting paper 14a is stretched into the network three-dimensional structure, so that the die-cutting paper 14a is stretched to form the liner 121a. The liner 121a enters the working platform 211 after passing through the stretching module 24, and then is located between the inner layer 11a and the outer layer 13a to be transported together.

Figure 10:
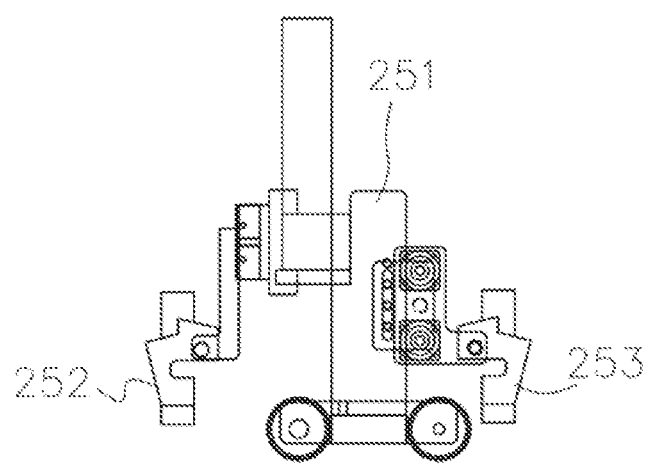
FIG. 10 is a schematic view of a first gluing module in accordance with an embodiment of the present disclosure.
Figure 11:
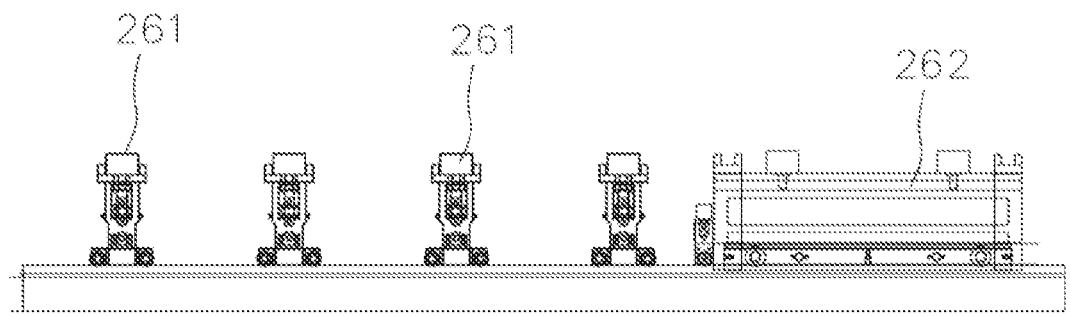
FIG. 11 is a schematic view of a first press-fit module in accordance with an embodiment of the present disclosure.

Referring to FIG. 10 and FIG. 11, each of the first and second planar structure manufacturing devices 200 further includes a plurality of first gluing modules 25 and a first press-fit module 26. The first gluing module 25 is arranged on the frame 21 and faces towards the working platform 211, each of the inner-layer paper material 14b, the liner 121a and the outer-layer paper material 14c are associated with at least one of the plurality of first gluing modules 25, the plurality of first gluing modules 25 configured to glue bonding positions of each layer of the inner-layer paper material 14b, the at least one layer of liner 121a and the outer-layer paper material 14c to join the inner-layer paper material 14b, the liner 121 and the outer-layer paper material 14c together.

Furthermore, the first gluing module 25 includes a bracket 251 positioned on the frame 21 and moving reciprocately relative to the working platform 211 along the conveying direction, a pair of horizontal nozzles 252 and a vertical nozzle 253 respectively arranged on the bracket 251, the pair of horizontal nozzles 252 respectively located on both sides of the bracket 251 and configured to glue the paper material on the working platform 211 along a direction perpendicular to the conveying direction, the vertical nozzle 253 configured to glue the inner-layer paper material 14b, the at least one layer of liner 121a and the outer-layer paper material 14c on the working platform 211 along a middle line of the conveying direction.

In an embodiment of the present disclosure, the inner layer 11a (inner-layer paper material 14b), the inner-core layer 12a (outer-layer paper material 14c) and the outer layer 13a are conveyed together in a step-by-step manner. After the step transportation is stopped, the bracket 251 moves vertically from a starting point at an edge of the working platform 211 to an edge at the other side of the working platform 211, and the pair of horizontal nozzles 252 can be configured to spray glue in a moving process, so that the inner layer 11a, the inner-core layer 12a and the outer layer 13a are sprayed with two parallel lines of spray glue track. And then, conveying another step, in the stepping process, the vertical nozzle 253 is opened, and the glue is sprayed on the middle line along the conveying direction. The first gluing module 25 is configured to glue the paper material to form an "H" shaped gluing track, each gluing track of the paper material of the inner layer 11a, the die-cutting paper 14a of the inner-core layer 12a and the paper material of the outer layer 13a is coincided with each other.

Furthermore, the first press-fit module 26 is arranged at a back end of the third tension adjusting device 233 and configured to press and fit the glued bonding positions to form the planar structure 10a.

Furthermore, the first press-fit module 26 includes a plurality of horizontal hot-pressing units 261 arranged on the working platform 211 at intervals, and at least one vertical hot-pressing unit 262. A spacing of each two adjacent horizontal hot-pressing units 261 is same as a spacing between the pair of horizontal nozzles 252; the plurality of horizontal hot-pressing units 261 is configured to press and fit positions glued by the pair of horizontal nozzles 252, that is, the two vertical lines of the "H" shaped gluing track are pressed together. The at least one vertical hot-pressing unit 262 is configured to press and fit a middle-line position glued by the vertical nozzle 253, that is, the middle-line of the "H" shaped gluing track is pressed.

Figure 13:
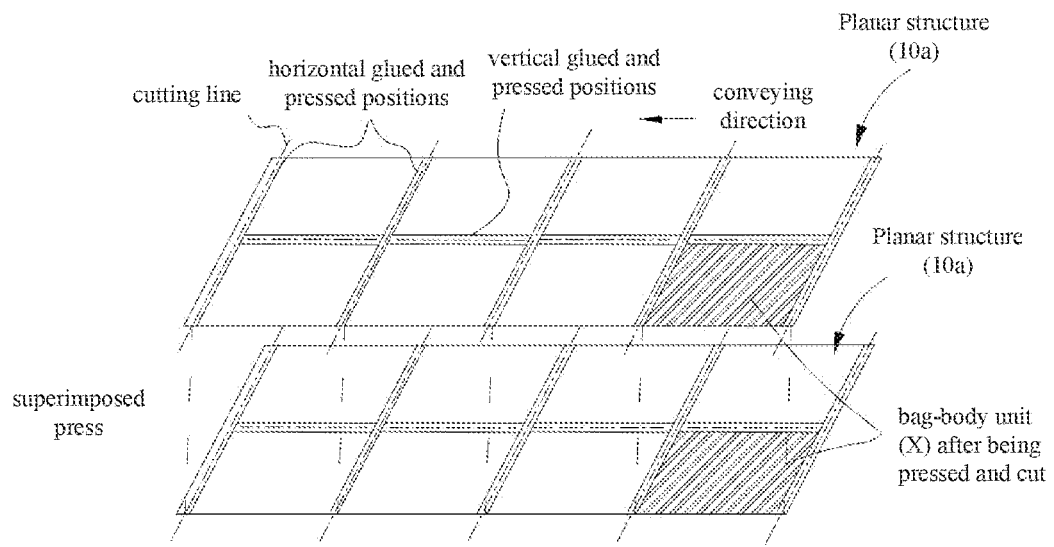
FIG. 13 is a partial schematic view of forming a bag-body unit in accordance with an embodiment of the present disclosure.

At this point, the planar structure 10a made by the planar structure manufacturing device 200 is completed. When the first and second planar structures 10a are provided to form the protective bag, specifically, the first and second planar structures 10a respectively made by the first and second planar structure manufacturing devices 200, respectively, are superimposed with each other along the conveying direction and then conveyed synchronously. Secondly, at least one edge surface of the first and second transported planar structures 10a is glued, pressed and fit, and cut to form the bag-body unit X, as shown in FIG. 13, finally, a bottom edge of the bag-body unit X is glued, and then folded to form the protective bag.

Figure 12:
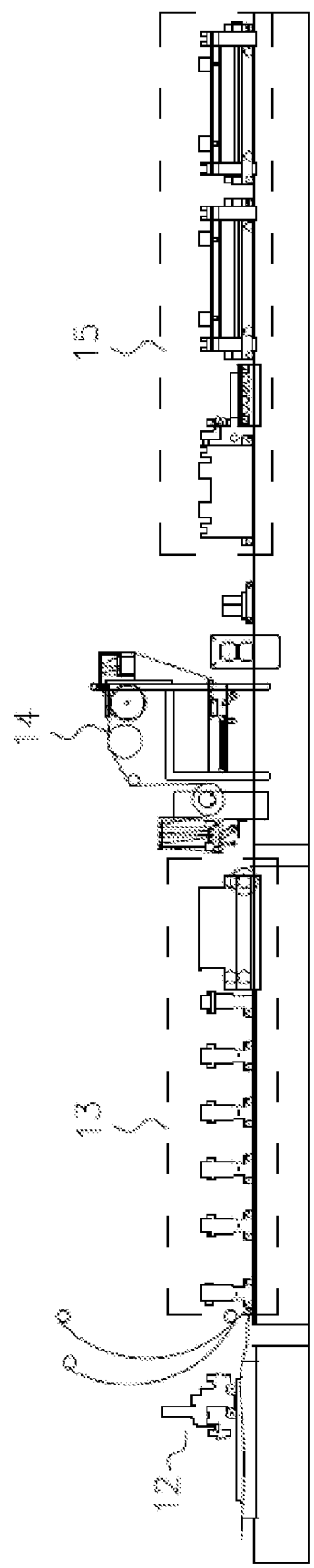
FIG. 12 is a partial schematic view of the manufacturing apparatus in accordance with an embodiment of the present disclosure.

Referring to FIG. 12, the manufacturing apparatus 100 further includes a second gluing module 12, a second press-fit module 13, a cutting module 14 and a gluing and edge-folding module 15.

Specifically, the second gluing module 12 is configured to glue edge surfaces of any one of the first and second planar structures 10a so as to adhere one of the first and second planar structures 10a to an edge of the other of the first and second planar structures 10a. In an embodiment of the present disclosure, the glued bonding position is exactly same as that of the first gluing module 25 on the plane structure 10a, and the structure of the second gluing module 12 is exactly same as that of the first gluing module 25.

The second press-fit module 13 is configured to press and fit the glued bonding positions. The structure of the second press-fit module 13 is same as that of the first press-fit module 26, and press and fit positions of the second press-fit module 13 on the planar structure 10a is also same as that of the first press-fit module 26.

Referring to FIG. 13, after being pressed by the second press-fit module 13, the first and second planar structures 10a form a plurality of continuous connecting "H" shaped band structures. The first and second planar structures 10a are connected with each other at a position of the two vertical edges and one horizontal edge of the "H" shaped band structure to form a double bag-body with an opening at one end thereof and a connection at the bottom thereof. The bottom of the connection is the horizontal line of the "H" structure, and positions of the opening are respectively upper positions and lower positions of the "H" structure. And then, after pressing and fitting the first and second planar structures 10a, the first and second planar structures 10a are cut by the cutting module 14 to form a plurality of bag-body units X. At this time, the plurality of bag-body units X is a plurality of separated single bag-bodies, and the single bag-body is obtained by cutting along a center horizontal line of the "H" shaped double bag-body.

Figure 14:
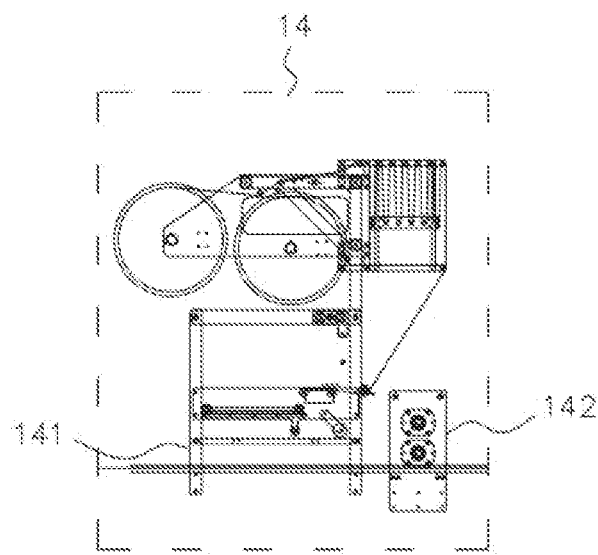
FIG. 14 is a schematic view of a cutting module in accordance with an embodiment of the present disclosure.

Referring to FIG. 14, specifically, the cutting module 14 includes a horizontal cutting knife 141 configured to cut the bonding positions in the direction perpendicular to the conveying direction, and a vertical cutting knife 142 configured to cut the bonding positions at the middle-line of the conveying direction.

Figure 15:
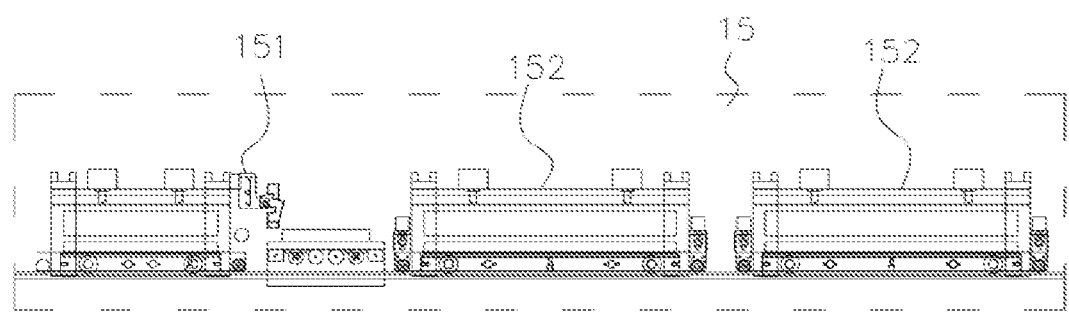
FIG. 15 is a schematic view of a gluing and edge-folding module in accordance with an embodiment of the present disclosure.

Referring to FIG. 15, furthermore, the gluing and edge-folding module 15 is configured to glue sides of the plurality of bag-body units X and then fold and press glued sides thereof together to form a bottom of the protective bag.

In an embodiment of the present disclosure, the glued bonding position of the bag-body unit X is the horizontal position of the "H" shaped gluing track. After gluing the horizontal position of the "H" shaped gluing track, it is folded and pressed both sides thereof along the center line position of the working platform 211 to form the protective bag. The gluing and edge-folding module 15 includes a gluing unit 151 configured to glue a bottom surface of the bag-body unit X located in the middle-line of the conveying direction, and an edge-folding and press-fit unit 152 configured to fold and press and fit the bottom edge glued by the gluing unit 151.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A manufacturing apparatus of an environmental paper protective bag, the paper protective bag made by planar structures, each of the planar structures comprising an inner layer, an outer layer and an inner-core layer arranged between the inner layer and the outer layer to form a buffer, the inner-core layer comprising at least one layer of liner; wherein the at least one layer of liner is a network three-dimensional structure formed by stretching a middle-layer paper material that has been die-cut, the manufacturing apparatus comprising:

first and second planar structure manufacturing devices arranged opposite to each other, each planar structure manufacturing device configured to produce a planar structure of the planar structures, each of the first and second planar structure manufacturing devices comprising:
- a frame comprising a working platform arranged along a conveying direction of paper material;
- an inner layer unreeling module and an outer layer unreeling module respectively arranged on the frame and respectively configured to unreel inner-layer paper material and outer-layer paper material, and
- at least one inner-core layer unreeling module arranged between the inner layer unreeling module and the outer layer unreeling module, and configured to unreel the middle-layer paper material, the inner layer unreeling module, the at least one inner-core layer unreeling module and the outer layer unreeling module arranged in turn along the conveying direction, wherein all the inner-layer paper material, the middle-layer paper material and the outer-layer paper material that have been unreeled are superimposed in turn, and arranged on the working platform to be transmitted along the conveying direction thereof;
- a first tension adjusting device arranged between the inner layer unreeling module and the working platform and configured to adjust tension of the inner-layer paper material;
- a second tension adjusting device arranged between the inner-core layer unreeling module and the working platform and configured to adjust tension of the middle-layer paper material;
- a third tension adjusting device arranged between the outer layer unreeling module and the working platform and configured to adjust tension of the outer-layer paper material;
- a stretching module arranged at a rear end of the second tension adjusting device and configured to stretch the middle-layer paper material that has been die-cut into the network three-dimensional structure so as to form the at least one layer of liner and then transmit the at least one layer of liner to the working platform;
- a plurality of first gluing modules arranged on the frame and facing-towards the working platform, each of the inner-layer paper material, the at least one layer of liner and the outer-layer paper material associated with at least one of the plurality of first gluing modules, the plurality of first gluing modules configured to glue bonding positions of each layer of the inner-layer paper material, the at least one layer of liner and the outer-layer paper material to join the inner-layer paper material, the at least one layer of liner and the outer-layer paper material together;
- a first press-fit module arranged at a back end of the third tension adjusting device and configured to press and fit the glued bonding positions to form the planar structure; and wherein
- first and second planar structures produced by the first and second planar structure manufacturing devices, respectively, are superimposed with each other along the conveying direction to be conveyed synchronously;

the manufacturing apparatus further comprising:
- a second gluing module configured to glue edge surfaces of any one of the first and second planar structures so as to adhere one of the first and second planar structures to an edge of the other of the first and second planar structures;
- a second press-fit module configured to press and fit the glued bonding positions of the first and second planar structures;
- a cutting module configured to cut the two pressed planar structures into a plurality of bag-body units;
- a gluing and edge-folding module configured to glue sides of the plurality of bag-body units and then fold and press glued sides thereof together to form a bottom of the protective bag.

2. The manufacturing apparatus as claimed in claim 1, wherein a structure of the first tension adjusting device is same as that of the third tension adjusting device, the first tension adjusting device comprising a swing arm, with an end being positioned on the frame, rotating relative to the frame, a plurality of rotating rollers arranged on the swing arm, and a plurality of rotating rods positioned on the frame and capable of be rotated, the unreeled inner-layer paper material and the unreeled outer-layer paper material respectively inserted between the plurality of rotating rods and the plurality of rotating rollers.

3. The manufacturing apparatus as claimed in claim 2, wherein the second tension adjusting device is configured to adjust tension of the middle-layer paper material that has been unreeled from the inner-core layer, so that the middle-layer paper material is on an un-stretched state before passing through the stretching module; the second tension adjusting device comprising a sliding rail, a sliding block installed on the sliding rail, a connecting roller positioned on the sliding block and capable of being rotated, and a servo motor configured to drive the sliding block to slide on the sliding rail, and the middle-layer paper material that has been die-cut passes through the connecting roller.

4. The manufacturing apparatus as claimed in claim 3, wherein the stretching module comprises:
- a transition roller arranged on the rear end of the second tension adjusting device and configured to receive the middle-layer paper material un-stretched;
- a differential roller arranged between the transition roller and the working platform, a rotating speed of the differential roller greater than a rotating speed of the transition roller, so that the middle-layer paper material passing through the transition roller is stretched into the network three-dimensional structure before entering the differential roller, so as to form the at least one layer of liner.

5. The manufacturing apparatus as claimed in claim 4, wherein the plurality of first gluing modules comprises:
- a bracket positioned on the frame and moving reciprocately relative to the working platform along the conveying direction;
- a pair of horizontal nozzles and a vertical nozzle respectively arranged on the bracket, the pair of horizontal nozzles respectively located on both sides of the bracket and configured to glue the inner-layer paper material, the at least one layer of liner and the outer-layer paper material on the working platform along a direction perpendicular to the conveying direction, the vertical nozzle configured to glue the inner-layer paper material, the at least one layer of liner and the outer-layer paper material on the working platform along a middle-line of the conveying direction;
- the plurality of first gluing modules configured to glue the inner-layer paper material, the middle-layer paper material of the inner-core layer, and the outer-layer paper material to form an "H" shaped gluing track, each gluing track of the inner-layer paper material, the middle-layer paper material of the inner-core layer and the outer-layer paper material coincided with each other.

6. The manufacturing apparatus as claimed in claim 5, wherein the first press-fit module comprises a plurality of horizontal hot-pressing units arranged on the working platform at intervals, and at least one vertical hot-pressing unit; a spacing of each two adjacent horizontal hot-pressing units same as a spacing between the pair of horizontal nozzles; the plurality of horizontal hot-pressing units configured to press and fit positions glued by the pair of horizontal nozzles, and the at least one vertical hot-pressing unit configured to press and fit a middle-line position glued by the vertical nozzle.

7. The manufacturing apparatus as claimed in claim 6, wherein a structure of the second gluing module is same as that of the first gluing module, and a structure of the second press-fit module is same as that of the first press-fit module.

8. The manufacturing apparatus as claimed in claim 7, wherein the cutting module comprises a horizontal cutting knife configured to cut the bonding positions in the direction perpendicular to the conveying direction, and a vertical cutting knife configured to cut the bonding positions at the middle-line of the conveying direction.

9. The manufacturing apparatus as claimed in claim 8, wherein the gluing and edge-folding module comprises a gluing unit configured to glue a bottom surface of a bag-body unit located in the middle-line of the conveying direction, and an edge-folding and press-fit unit configured to fold and press and fit the bottom edge glued by the gluing unit.

* * * * *